United States Patent
Beal

(10) Patent No.: US 8,746,617 B2
(45) Date of Patent: Jun. 10, 2014

(54) AIRCRAFT CABIN MODULE AND ASSOCIATED AIRCRAFT CABIN EQUIPPED WITH SAME

(75) Inventor: Benoit Beal, Neuvy-Pailloux (FR)

(73) Assignee: Zodiac Seats France, Issoudun (FR)

(*) Notice: Subject to any disclaimer, the term of this patent is extended or adjusted under 35 U.S.C. 154(b) by 21 days.

(21) Appl. No.: 13/148,986

(22) PCT Filed: Feb. 25, 2010

(86) PCT No.: PCT/FR2010/050329
§ 371 (c)(1),
(2), (4) Date: Nov. 21, 2011

(87) PCT Pub. No.: WO2010/097552
PCT Pub. Date: Sep. 2, 2010

(65) Prior Publication Data
US 2012/0187244 A1    Jul. 26, 2012

(30) Foreign Application Priority Data
Feb. 25, 2009  (FR) ..................... 09 51187

(51) Int. Cl.
*B64C 11/06* (2006.01)
(52) U.S. Cl.
USPC ............... 244/118.6; 244/118.5; 105/315
(58) Field of Classification Search
USPC ................ 244/118.5, 118.6; 105/314–319
See application file for complete search history.

(56) References Cited

U.S. PATENT DOCUMENTS

| | | | |
|---|---|---|---|
| 2,914,001 A | 11/1959 | Murphy | |
| 4,881,702 A * | 11/1989 | Slettebak | 244/118.6 |
| 5,716,026 A * | 2/1998 | Pascasio et al. | 244/118.6 |
| 5,876,059 A * | 3/1999 | Kleinberg | 280/730.1 |
| 6,616,098 B2 * | 9/2003 | Mills | 244/118.5 |
| 6,932,298 B1 * | 8/2005 | Mills | 244/118.5 |
| 7,275,716 B2 * | 10/2007 | Saint-Jalmes | 244/118.6 |
| 7,354,018 B2 * | 4/2008 | Saint-Jalmes | 244/118.5 |
| 7,389,959 B2 * | 6/2008 | Mills | 244/118.5 |
| 2007/0102577 A1 * | 5/2007 | Saint-Jalmes et al. | 244/118.6 |
| 2009/0302156 A1 * | 12/2009 | Saint-Jalmes et al. | 244/118.6 |

FOREIGN PATENT DOCUMENTS

DE     102005052229     5/2007

(Continued)

OTHER PUBLICATIONS

Japan Patent Application No. 2011-551514, Official Action dated Jan. 14, 2014, 4 pages (includes translation).

*Primary Examiner* — Tien Dinh
*Assistant Examiner* — Michael Wang
(74) *Attorney, Agent, or Firm* — Kilpatrick Townsend & Stockton LLP; Tiffany L. Williams, Esq.; Dean W. Russell, Esq.

(57) ABSTRACT

Described are aircraft cabin modules including at least two seats positioned one behind the other and at least one upper berth positioned above at least one lower berth, each of said berths being associated with one of the seats. The upper berth extends over part of the length of the lower berth, but not all of the length thereof, in order to optimize the space in the cabin. The aircraft cabin may be equipped with two- or three-berth modules.

24 Claims, 9 Drawing Sheets

(56) References Cited

FOREIGN PATENT DOCUMENTS

Figure 1A:
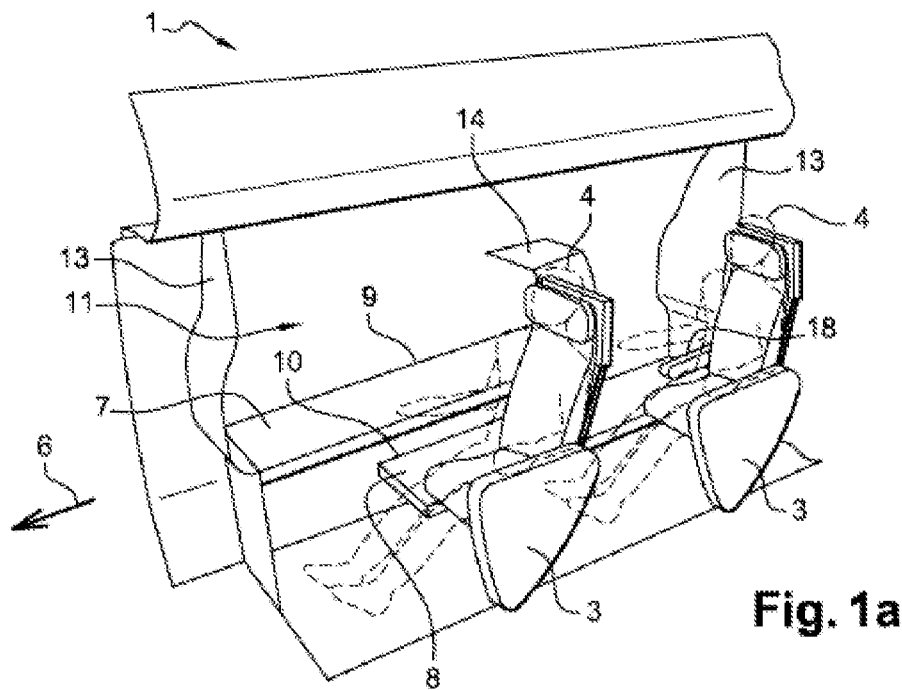
Figure 1B:
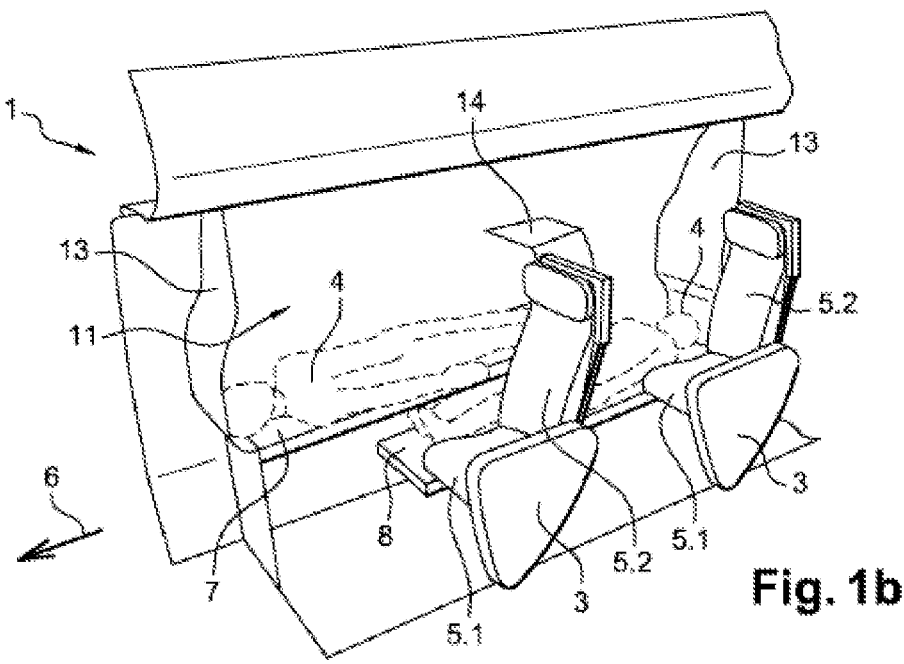
Figure 2A:
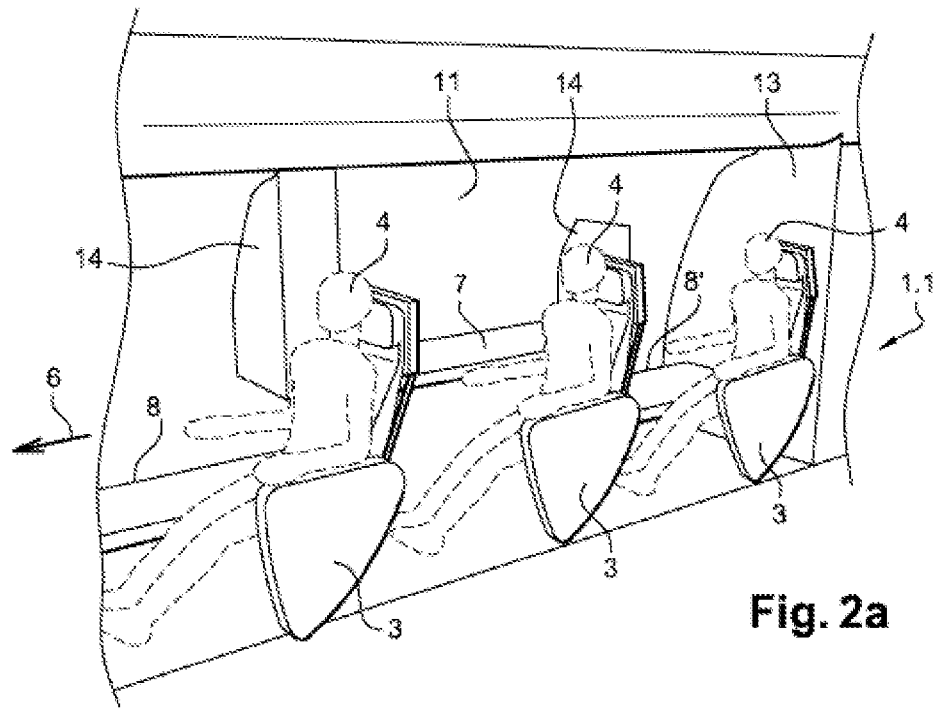
Figure 2B:
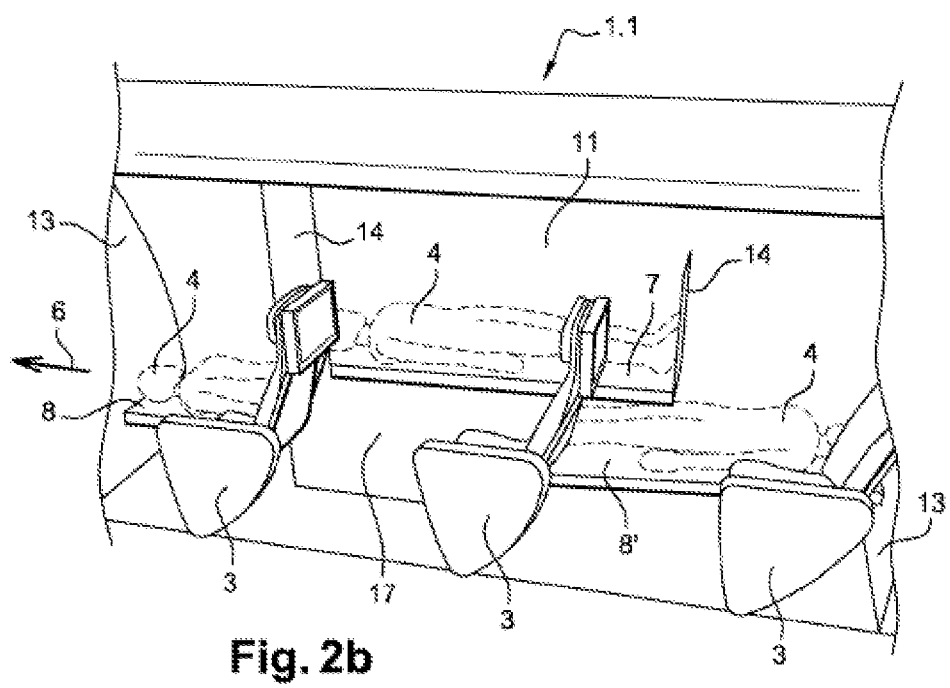
Figure 3:
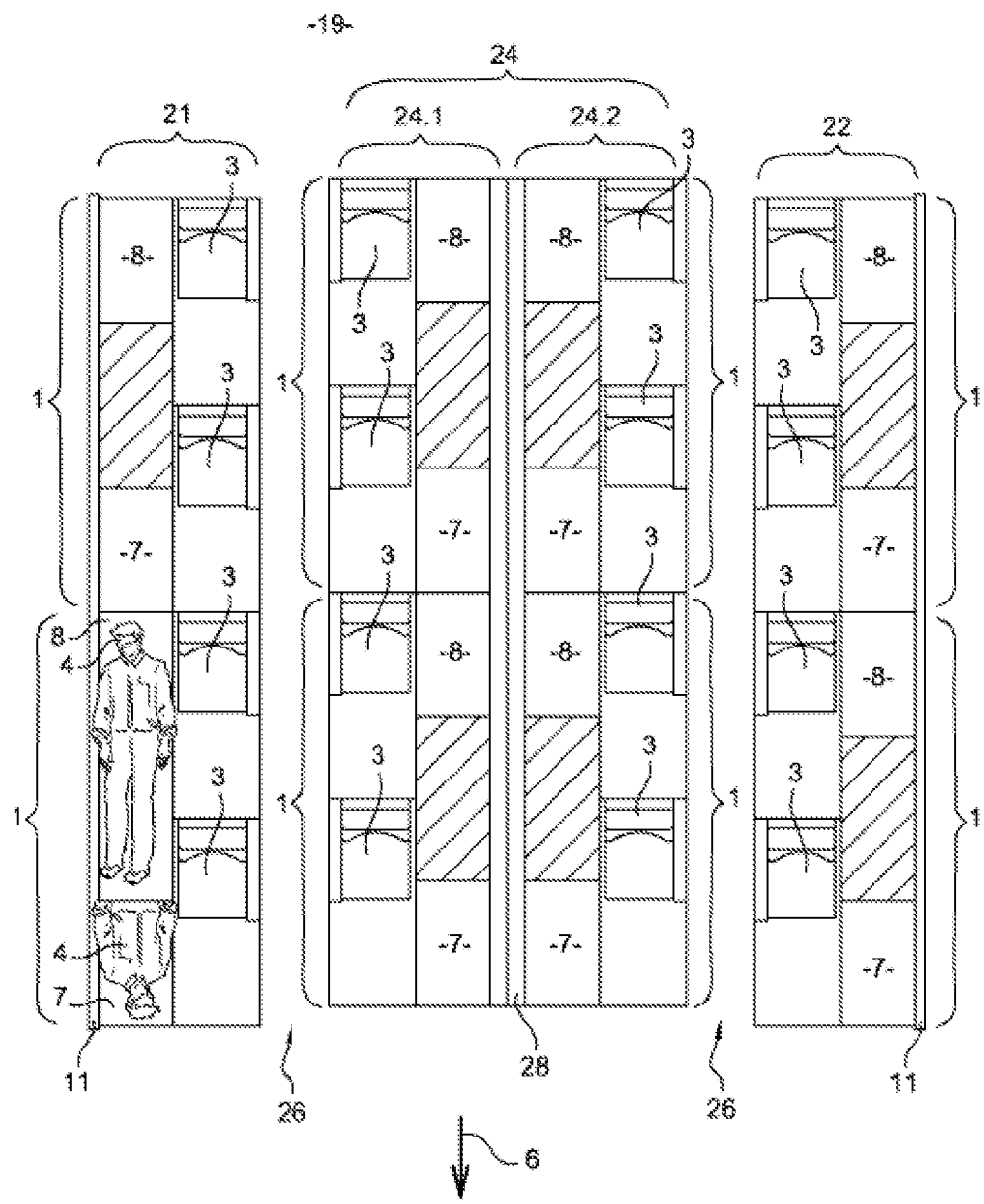
Figure 4:
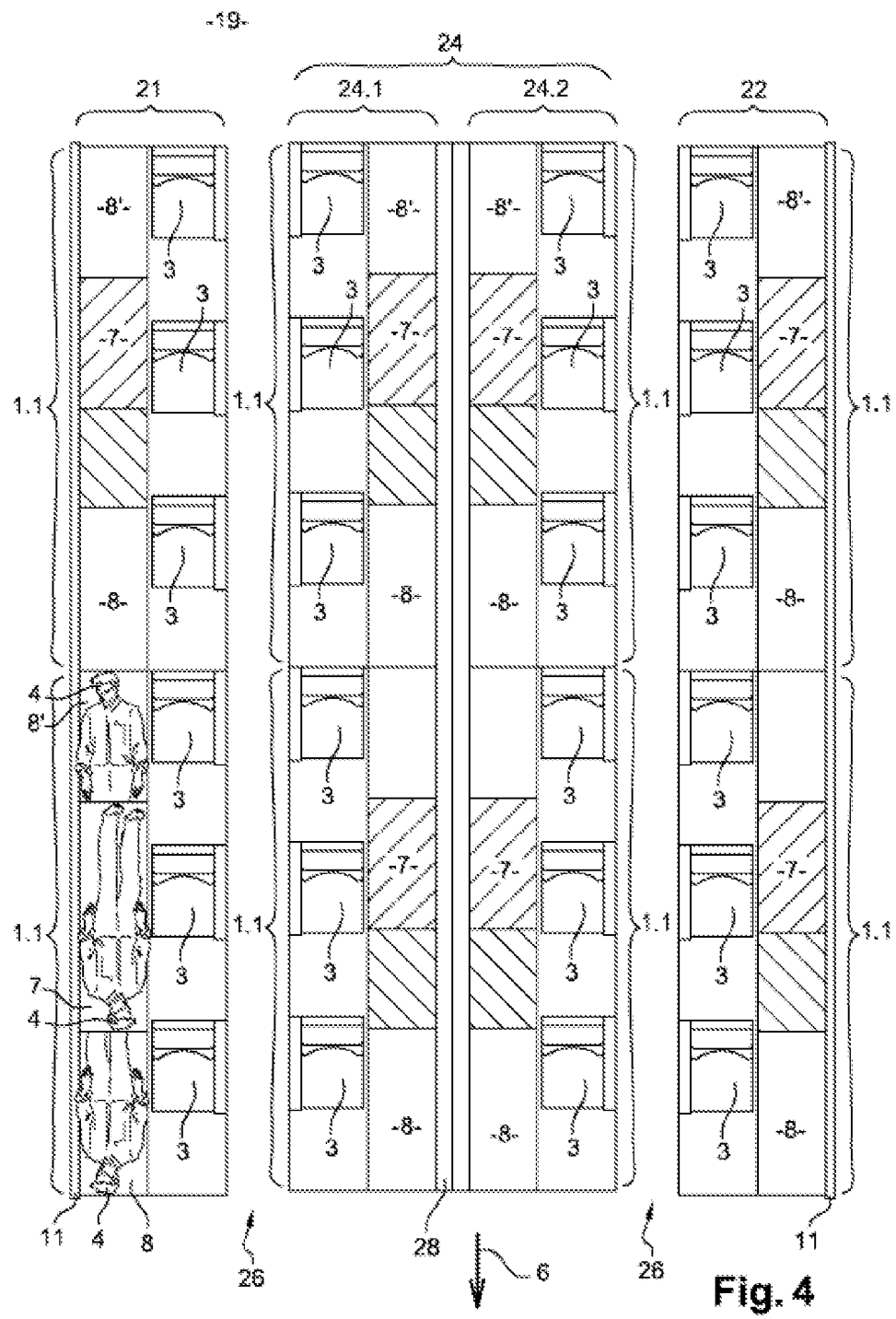
Figure 5A:
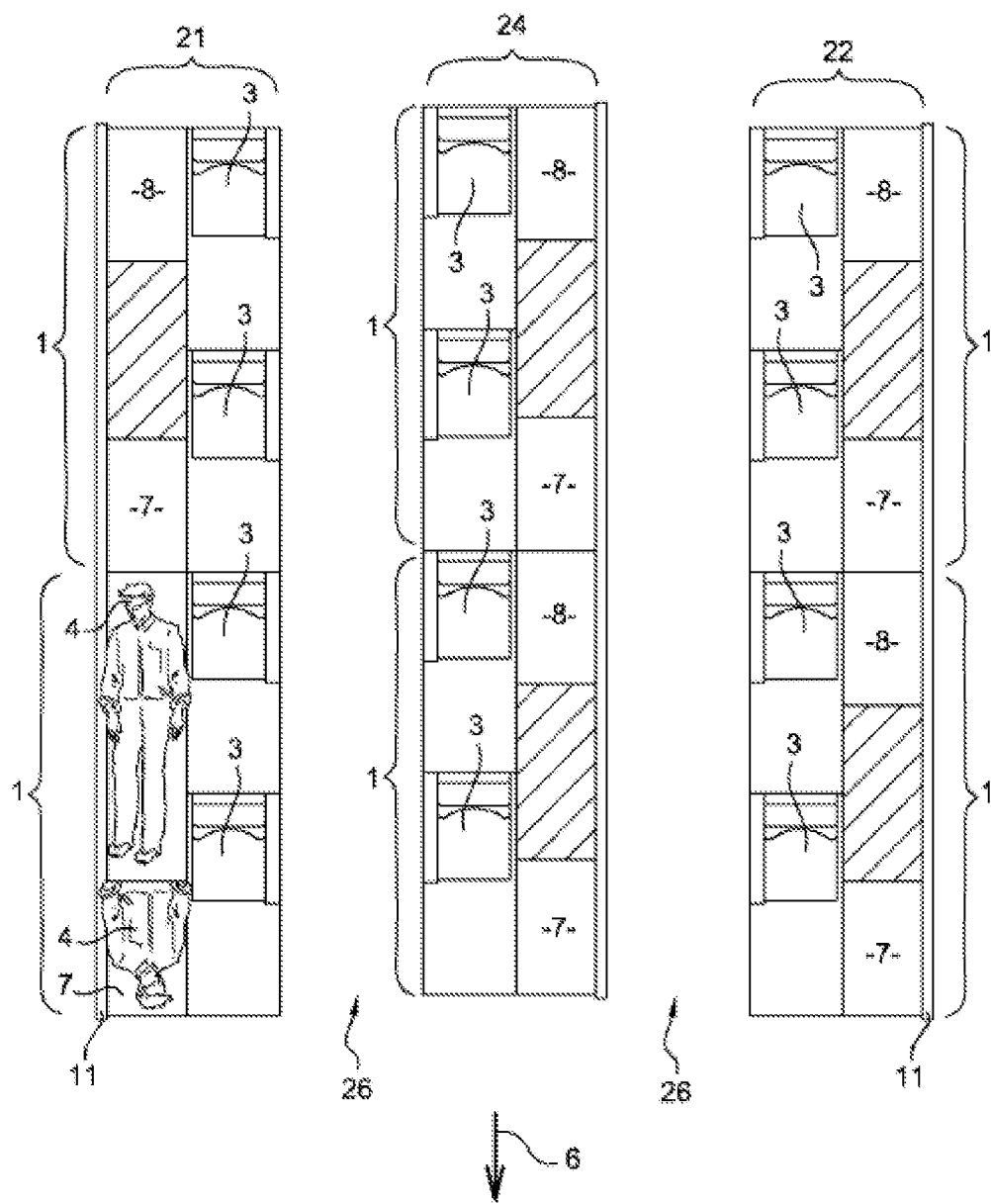
Figure 5B:
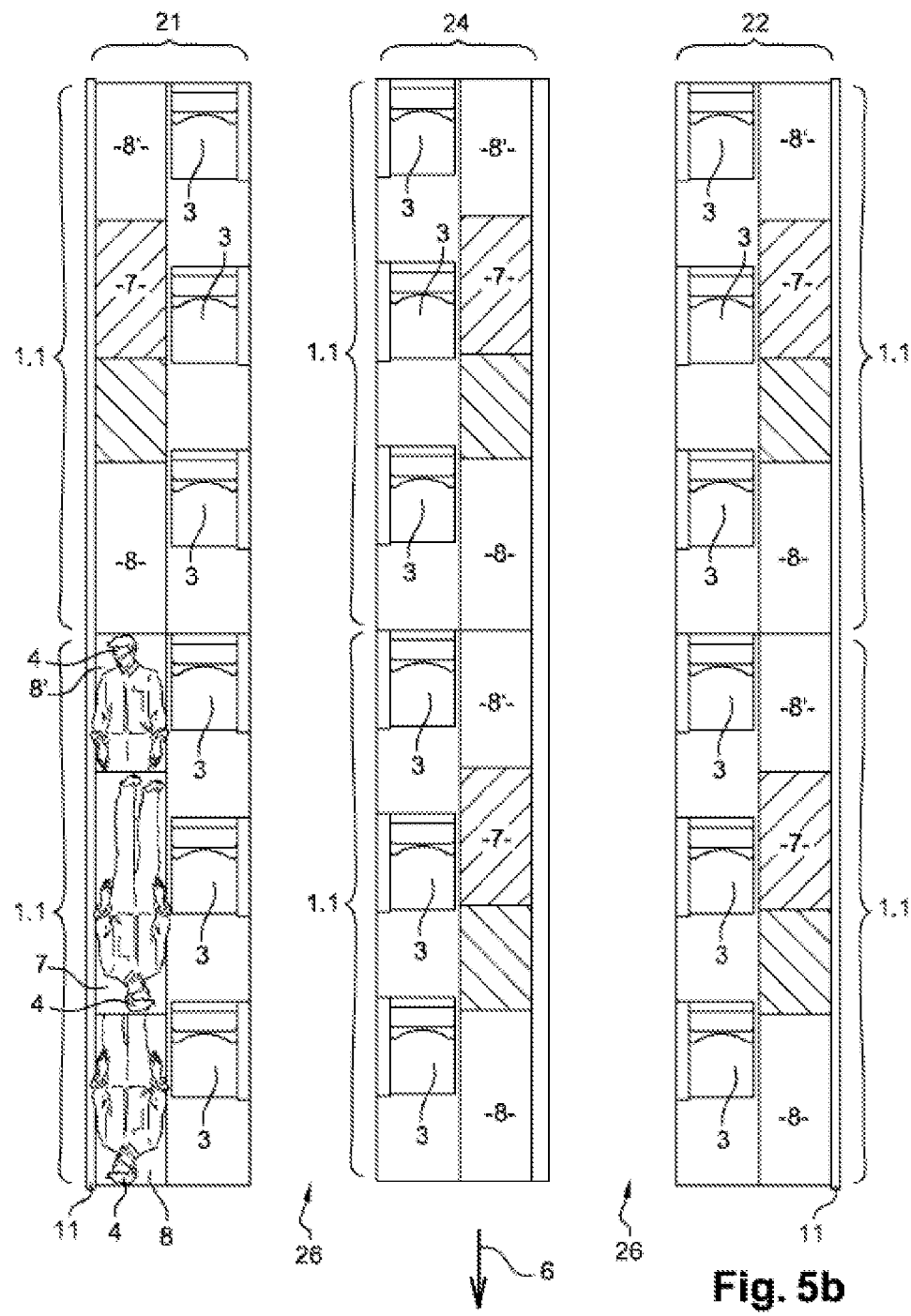
Figure 6A:
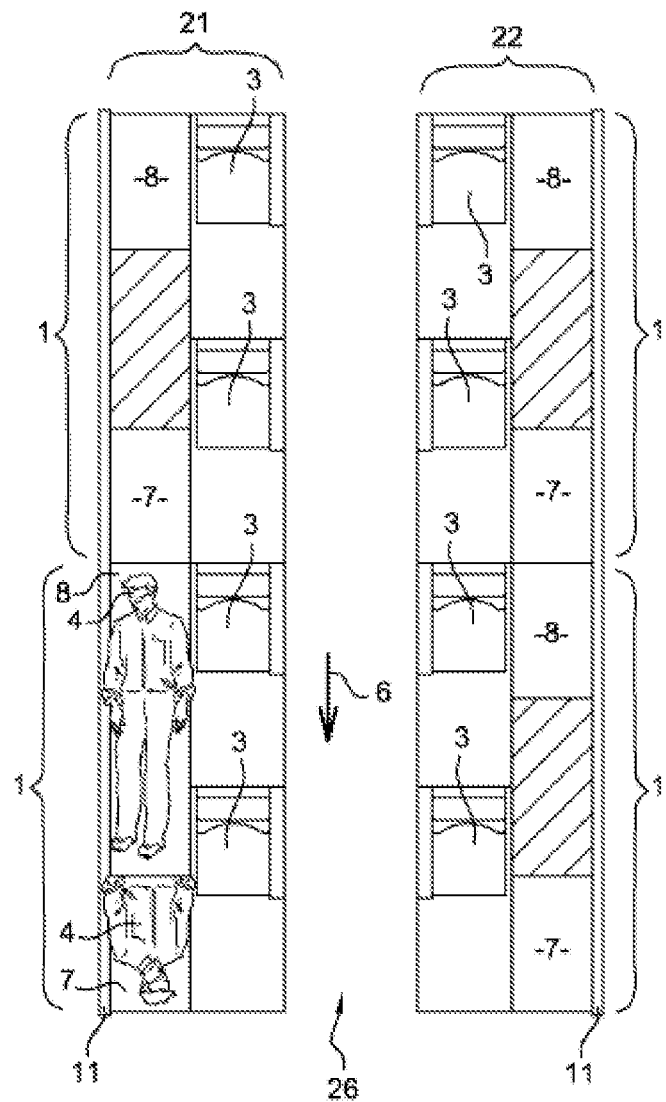
Figure 6B:
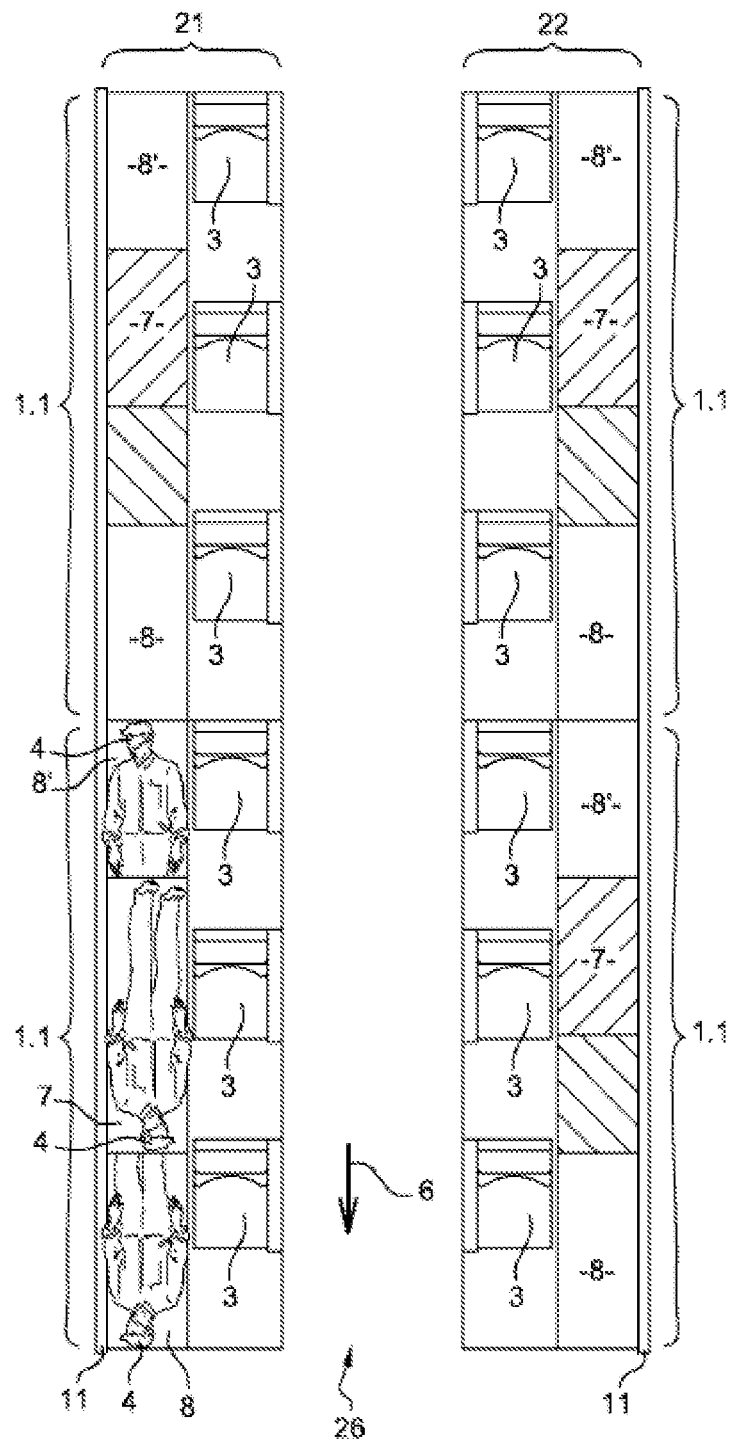
Figure 7:
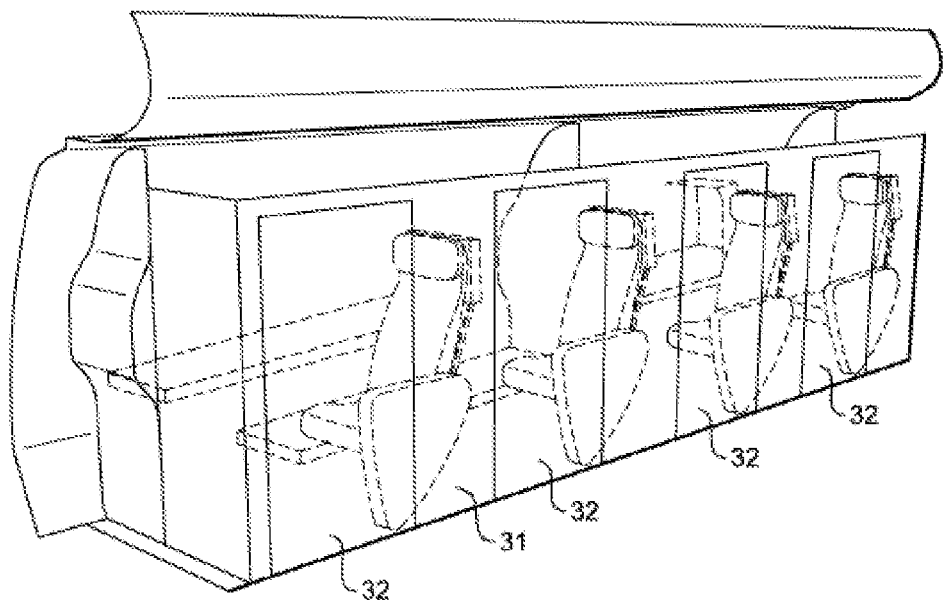

| FR | 2256857 | 8/1975 |
| FR | 2842497 | 1/2004 |
| FR | 2842498 | 1/2004 |
| FR | 2842498 A1 * | 1/2004 |
| GB | 598859 | 2/1948 |
| JP | 2009-513441 A | 4/2009 |
| WO | 02/28712 A1 | 4/2002 |
| WO | WO0226712 | 4/2002 |

* cited by examiner

AIRCRAFT CABIN MODULE AND ASSOCIATED AIRCRAFT CABIN EQUIPPED WITH SAME

CROSS REFERENCE TO RELATED APPLICATIONS

This application is the U.S. national phase of International Application No. PCT/FR2010/050329 filed on Feb. 25, 2010, which application claims priority to French Patent Application No. 0951187 filed on Feb. 25, 2009, the contents of both of which are incorporated herein by reference.

This invention concerns an aircraft cabin module and an associated aircraft equipped with same. The main objective of the invention is to propose a low cost equipped cabin allowing each passenger to easily go from a seated position to a lying down position.

The application of this invention is particularly advantageous for long haul aircrafts that carry out long journeys during which the passengers might wish to lie down and rest.

People are aware of the airplane cabin passenger seats that can be converted into berths. In this type of arrangement, the seats for each place are generally made up of a back, a chair and a leg rest. Each of these elements can be moved by the activation methods used to go from a seated position to a lying-down position and vice-versa. However, the use of the activation methods incurs heightened costs for both seat manufacture as well as for their maintenance.

There is therefore a need for a low-cost equipped solution which allows for the noticeable avoidance of using activation methods.

The invention satisfies this need by proposing an equipped cabin that offers each passenger an environment consisting of a separate seat and berth.

The seats and berths are arranged in the following way: there is a matching upper berth or lower berth for every seat. The upper berths extend partially over the lower berths in the sense that they are at such a length so as to optimize the density of room in the cabin. It is noted that partial extension does not incorporate the entire extension, which corresponds to the extension of the bunk beds.

The invention thus offers good reliability and a low manufacturing cost since it is possible to do without the moveable parts of the chairs, even if it is nevertheless possible to use the seats with bases or backs with an adjustable tilt. The configuration of the cabin according to the invention also gives each passenger good privacy since the seat/berth ensembles are separated from one another.

Moreover, the invention allows easy access to the two berths (upper and lower) thanks to the partial extension of the berths (unlike the classic bunking berths). Indeed, the upper space of the lower berth being an open space in the area where the upper berth does not extend over the lower berth, the passenger can easily access this lower berth by this open area.

The upper and lower berths allow each passenger to adopt a seated position on their berth (middle position) so that you can move easily into the lying down position.

Moreover, in the design, the seats are positioned one behind the other and adjoin an aircraft aisle, which allows direct access to the aisle for each passenger independently from the surrounding passenger.

The invention thus involves an aircraft cabin module characterized by what it includes:
at least two seats positioned one behind the other, and
at least one upper berth positioned above at least one lower berth, each berth being linked to one of the chairs, each berth is of a length that allows the passengers to lie down, the upper berth partially, not wholly, extends lengthways over the lower berth,
the seats are positioned beside the berths,
so as to optimize the cabin space.

In accordance with the design, the seats and the berths are arranged in parallel to one another according to their width.

In accordance with the design, the upper and lower berths are in a fixed position.

In accordance with the design, the floor of the module is at the same level as the floor of the aircraft.

In accordance with the design, the upper berth is accessible without a step or a ladder.

In accordance with the design, it consists of a third seat and a second lower berth, the upper berth partially extended lengthways along the two lower berths, the two lower berths being positioned one behind the other in the same alignment.

In accordance with the design, the lower berths are approximately positioned edge-to-edge.

In accordance with the design, the upper berth extends to over 90% of the length of the lower berth, preferably 60%.

In accordance with the design the upper berth and the lower berth extend over one another widthways almost completely.

In accordance with the design, it involves vertical partitions ensuring the module is separated from the other surrounding modules, and the partitions allow the upper berth to be separated from the lower berth.

In accordance with the design, the upper berth is equipped with a flat board directed longitudinally towards the base so that passengers' legs are hidden from the lower berths.

In accordance with the design, the berths are fixed to the airplane floor.

In accordance with the design, each seat is comprised of a removable arm-rest on the side of the berth linked to that seat in order to facilitate access to the berths.

In accordance with the design, the available space under the berths or under the base of the seats is equipped to store luggage.

In accordance with the design, the berths are at such an angle in relation to the floor so that they are horizontal during the flight.

The invention, moreover, relates to an equipped aircraft cabin with features comprising of the following:
two lateral groups of modules which in accordance with the invention are positioned along the airplane inner walls, and
a central group of modules which in accordance with the invention are positioned between the two lateral groups, the central group being separated from each lateral group by a traffic aisle.

In accordance with the design, the floor of the modules of the central group and of the lateral groups is positioned at the same level as the aircraft floor.

In accordance with the design, the lateral groups are each made up of a row of modules which in accordance with the invention stretch along the length of the airplane, each lateral group comprising of a column of seats adjoining a traffic aisle and a column of berths positioned along the lateral walls of the plane.

In accordance with the design, the central group is made up of two rows of modules which in accordance with the invention are positioned on both sides by a central longitudinal inner wall, each row of modules made up of a column of seats adjoining a traffic aisle and a column of berths positioned along the central inner wall.

In accordance with the design, the central wall can be folded away so as to allow the central berths which are positioned on either side of the inner wall to merge two by two to form double beds.

In accordance with the design, the central group is made up of a single row of modules in accordance with the invention.

In accordance with the design, the cabin is without a central group, the lateral groups of the modules being separated one from the other by a single traffic aisle.

In accordance with the design, the modules in accordance with the invention are separated from the traffic aisles by partitions fitted with doors stretching the length of the airplane.

The invention will be better understood by reading the description that follows and by examining the diagrams that accompany it. These diagrams are only provided for illustration purposes but are not at all restrictive of the invention. They show:

Diagrams 1a-1b: three dimensional views of a two-berth module in accordance with the invention by which the passengers are represented in a seated and lying down position respectively;

Diagrams 2a-2b: three dimensional views of a three-berth module in accordance with the invention by which the passengers are represented in a seated and lying down position respectively;

Diagram 3: a view from above of an arrangement of two-berth modules of Diagram 1 in an aircraft cabin in accordance with the invention;

Diagram 4: a view from above of an arrangement of three-berth modules of Diagram 2 in an aircraft cabin in accordance with the invention;

Diagrams 5a-5b: a view from above of an arrangement in accordance with the invention in which the central group consists of a single row of modules in accordance with the invention;

Diagrams 6a-6b: a view from above of an arrangement of modules in accordance with the single aisle type of invention;

Diagram 7: a three-dimensional view of a partition fitted with doors allowing the modules to be separated in accordance with the airplane aisle invention.

The identical elements keep the same reference from one diagram to another.

Diagrams 1a and 1b show a module 1 for an aircraft cabin which in accordance with the invention is meant for long haul airplanes. This module 1 is comprised of two seats 3 on which passengers 4 can sit. These seats 3 positioned one behind the other are meant to adjoin a traffic aisle of the airplane. These seats 3 are directed towards the front of the apparatus as shown by arrow 6. As an example, the space between the seats 3 is made up of between 40 and 60 inches.

These seats 3 are each made up of a base 5.1, a back 5.2 and if need be a leg rest (not shown). Each seat 3 can be equipped with a mechanic or electric kinetic more or less molded so that the parts 5.1, 5.2 can be static or adjustable when tilting the one with the other. Moreover, the space under the base 5.1 can be used as a storage space. These seats 3 are fixed to the rails installed on the aircraft floor. Thus the module's floor 1 is at the same levels as the aircrafts floor.

This module 1 is also comprised of an upper berth 7 positioned above a lower berth 8, these berths 7 and 8 are each of such a length that the passengers 4 can lie down. These berths 7 and 8, which are positioned on one side of the seat 3 to which they are linked (to the right or to the left), have their length directed following the length of the aircraft. As an example, the berths 7 and 8 are fixed to the airplane floor. The passenger of the upper berth 7 can direct their head equally towards the front or to the back of module 1. Preferably, the berths, 7, 8 are at such an angle in relation to the floor that they are horizontal during the flight.

The upper berth 7 partially and not wholly extends lengthways along the lower berth 8 so as to optimize the space in cabin 1. This arrangement moreover allows easy access to the lower berth 8 through the free space in the area where the berth 7 does not extend over the berth 8. As an example, the upper berth 7 extends lengthways for more than 90% of the lower berth 8, preferably 60%.

Preferably, the two berths 7, 8 extend approximately the entire width, in such a way that the plan passing by the longitudinal sides 9 and 10 of the berths is approximately parallel to the plan passing by the opposite longitudinal ends. However, as a variation, the berths 7 and 8 could be slightly moved back widthways one compared to the other.

As a variant of the design represented in Diagrams 2a and 2b, module 1.1 comprises of a third seat and a third berth. Module 1.1 is comprised thus of three seats 3 positioned one behind the other and three associated berths 7, 8 and 8'. This method of design allows the occupancy of the aircraft cabin to be made denser.

The three-berth ensemble is made up of an upper berth 7 and two lower berths 8, 8' one behind the other in the same alignment. The upper berth 7 partially extends lengthways along the two lower berths 8 and 8'. As an example, the upper berth 7 extends over each of the lower berths 8, 8' by about 50% of their length.

Preferably, the lower berths 8, 8' are positioned approximately edge to edge in the area situated under the upper berth 7.

The space between the edge of the berths 8 and 8' is thus very limited, less than 10 cm. It might be necessary to add some centimeters to ease its maintenance.

As it is shown in the Diagrams, the seats 3 are positioned beside berths 7 and 8 (and if need be 8'). Preferably, seats 3 and berths 7, 8, 8' are arranged in parallel to one another widthways. Indeed, the row of the seats 3 is parallel to the length direction of the berths 7, 8, 8' with regard to the width of the aircraft.

Moreover, the upper 7 and lower 8 berths (and if need be 8') are fixed, that is to say, they are not bendable along a transversal or longitudinal axis in order to be folded for example against the aircraft wall.

Whether it is for modules 1 or 1.1, the partitions 13 extend vertically, preferably for the entire height of the cabin, ensuring the separation of the modules 1, 1.1 between them. Moreover, the vertical partitions 14 allow the spaces to be separated within the module 1, 1.1, in order to separate the upper berth 7 from there or from the lower berths 8, 8'.

In addition, the upper berths 7 can each be equipped with a flat board 17 directed longitudinally towards the base so that passengers' legs 4 are hidden from the lower berths 8, 8'.

Moreover, as shown in Diagram 1a, each seat 3 can include a removable arm-rest 18 (that which is situated beside the berth linked to the seat) to facilitate access to berths 7 or 8.

Preferably, the upper berth 7 is positioned at a slight height, so that it is easily accessible without the help of a step or a ladder.

It is also possible to fit out the available space under berths 7, 8, 8' so as to store luggage.

Moreover, the equipment, such as audio-video equipment, a meal tray, a glass holder, a pocket for holding magazines, a life jacket, or any other parts you would typically find in an airplane, can be placed on the back of the seats 3 or in the lateral arm rests.

Diagram 3 shows an aircraft cabin 19 in accordance with the invention comprising of two lateral groups 21, 22 of modules 1 positioned along the airplane inner walls and one central group 24 of modules 1 positioned between the two lateral groups, the central group 24 being separated by each of the lateral groups 21, 22 by a traffic aisle 26.

The lateral groups 21, 22 are each made up of a row of modules 1 stretching the length of the airplane, that is to say, from the back towards the front as indicated by arrow 6. Each lateral group 21, 22 is also comprised of a column of seats 3 adjoining the aisle 26 and a column of berths 7, 8 positioned along the lateral walls 11 of the airplane which consists of the airplane fuselage.

The central group 24 is made up of two rows 24.1 and 24.2 of modules 1 positioned on both sides of a central longitudinal wall 28. This wall 28 is part of module 1 and is added onto the airplane. Each row 24.1, 24.2 of modules 1 is thus made up of a column of seats 3 adjoining an aisle 26 and of a row of berths 7, 8 positioned along the central inner wall 28. According to the design, the central wall 28 can be folded away to allow the central berths positioned on both sides of the wall 28 to join two by two to form double beds.

The hatched areas on Diagram 3 correspond to the extended zones following their length between the upper berth 7 and the lower berth 8.

This diagram highlights that the berths 7 and 8 preferably cover, entirely widthways, the passengers 4 shown in a lying down position being situated precisely below one another.

Diagram 4 shows an arrangement of a cabin 19 identical to that which is shown in Diagram 3, with the exception that the two-berth modules 1 have been replaced by three-berth modules 1.1 in accordance with the invention.

The hatched areas towards the right correspond for each module 1.1 to the area which has been extended lengthways between the upper berth 7 and one of the lower berths 8, whereas the areas hatched towards the left correspond to the area which has been extended lengthways between the upper berth 7 and the other lower berth 8'.

Diagrams 5a and 5b show, for a two-berth and three-berth configuration respectively in accordance with the invention, a design variation in which the central group 24 only consists of a single row of modules 1 respectively 1.1.

Diagrams 6a and 6b show, for a two-berth and three-berth configuration respectively in accordance with the invention, a design variation in which the central group 24 has been removed, the groups 21, 22 being separated one from the other by a unique aisle 26.

The arrangements of Diagrams 5 and 6 allow the spaces 3 and berths 7, 8 to be widened with regard to an arrangement of two central rows of modules 1, 1.1, which has been particularly well-adapted for the $1^{st}$ class compartment.

In any case, the floor of the lateral group modules 21, 24 and if need be of the central group 24 is positioned at the same level as the floor of the aircraft. Thus the passenger is at the same level when they walk in the aircraft aisle or within a module.

Diagram 7 shows a design in which the modules 1, 1.1 according to the invention, are separated from the aisles 26 by partitions 31 fitted out with doors 32 extending along the length of the airplane.

The invention claimed is:

1. Aircraft cabin module comprising:
    two seats positioned one behind the other, and
    one upper berth positioned above one lower berth, each berth being directly linked to one of the seats and being of a length that allows a passenger to lie down,
    the upper berth partially, but not wholly, extending lengthways over the lower berth,
    the seats being positioned beside the berths, so as to optimize cabin space,
    wherein the upper berth is equipped with a flat board directed longitudinally toward the bottom in a direction of the lower berth so that a passenger's legs are hidden within the lower berth from view by another passenger seated in the seat not directly linked to the lower berth, the flat board being substantially parallel to a wall of the cabin module,
    a first transversal extremity of the upper berth being positioned proximate a first vertical element extending vertically,
    a second transversal extremity of the upper berth being positioned proximate a second vertical element extending vertically in a direction opposite to the lower berth, and
    a first transversal extremity of the lower berth opposite a second transversal extremity of the lower berth overlapping at least partially with the upper berth, the first transversal extremity being positioned proximate a third vertical element extending vertically,
    thereby allowing spaces to be separated within the module.

2. Module in accordance with claim 1, wherein the seats and the berths are arranged parallel to one another according to their width.

3. Module in accordance with claim 1, wherein the upper and lower berths are in a fixed position.

4. Module in accordance with claim 1, wherein a floor of the module is at the same level as a floor of the aircraft cabin.

5. Module in accordance with claim 1, wherein the upper berth is accessible without a step or a ladder.

6. Module in accordance with claim 1, comprising a third seat and a second lower berth, the upper berth partially extended lengthways along the two lower berths, the two lower berths being positioned one behind the other in the same alignment.

7. Module in accordance with claim 6, wherein the lower berths are approximately positioned edge-to-edge.

8. Module in accordance with claim 1, wherein the upper berth extends to at most 90% of the length of the lower berth.

9. Module in accordance with claim 1, wherein the upper berth and the lower berth extend over one another widthways almost completely.

10. Module in accordance with claim 1, wherein the berths are fixed to a floor of the aircraft cabin.

11. Module in accordance with claim 1, wherein each seat is comprised of a removable arm-rest on the side of the berth linked to that seat in order to facilitate access to the berths.

12. Module in accordance with claim 1, wherein available space under the berths or under a base of the seats is equipped to store luggage.

13. Module in accordance with claim 1, wherein the berths are at such an angle in relation to a floor of the aircraft cabin so that they are horizontal during flight.

14. An equipped aircraft cabin with features comprising:
    two lateral groups of modules according to claim 1 being positioned along inner walls of the aircraft cabin.

15. Cabin in accordance with claim 14, wherein the two lateral groups are separated by a single aisle.

16. An equipped aircraft cabin with features comprising:
    two lateral groups of modules according to claim 1 being positioned along inner walls of the aircraft cabin, and
    a central group of modules according to claim 1 positioned between the two lateral groups, and being separated from each lateral group by a traffic aisle.

17. Cabin in accordance with claim 16, wherein:
    a floor of the modules of the central group and of the lateral groups is positioned at the same level as a floor of the aircraft cabin.

18. Cabin in accordance with claim 16, wherein:
the central group of modules is made up of two rows of modules which are positioned on both sides by a central longitudinal inner wall,
each row of modules is made up of a column of seats adjoining the traffic aisle and a column of berths positioned along the central longitudinal inner wall.

19. Cabin in accordance with claim 18, wherein the central longitudinal inner wall can be folded away so as to allow the berths that are positioned on either side of the central longitudinal inner wall to merge two by two to form double beds.

20. Cabin in accordance with claim 16, wherein the central group of modules is made up of a single row of modules.

21. Cabin in accordance with claim 16, wherein the modules are separated from the traffic aisles by partitions fitted with doors stretching the length of the aircraft.

22. Cabin in accordance with claim 16, wherein, in a group of modules, vertical partitions ensure one module is separated from other surrounding modules, and the upper berth is separated from the lower berth.

23. An equipped aircraft cabin with features comprising
two lateral groups of modules according to claim 1 being positioned along inner walls of the aircraft cabin, the lateral groups are each made up of a row of modules which in accordance with claim 1 stretch along the length of the aircraft, each lateral group comprising a column of seats adjoining a traffic aisle and a column of berths positioned along the lateral walls of the aircraft; and
a central group of modules according to claim 1 positioned between the two lateral groups, and being separated from each lateral group by a traffic aisle.

24. Aircraft cabin module comprising:
two seats positioned one behind the other, and
one upper berth positioned above one lower berth, each berth being directly linked to one of the seats and being of a length that allows a passenger to lie down,
the upper berth partially, but not wholly, extending lengthways over the lower berth,
the seats being positioned beside the berths, so as to optimize cabin space,
wherein a floor of the module is at the same level as a floor of the aircraft cabin, and
the upper berth is accessible without a step or a ladder,
wherein the upper berth is equipped with a flat board directed longitudinally toward the bottom in a direction of the lower berth so that a passenger's legs are hidden within the lower berth from view by another passenger seated in the seat not directly linked to the lower berth, the flat board being substantially parallel to a wall of the cabin module,
a first transversal extremity of the upper berth being positioned proximate a first vertical element extending vertically,
a second transversal extremity of the upper berth being positioned proximate a second vertical element extending vertically in a direction opposite to the lower berth, and
a first transversal extremity of the lower berth opposite a second transversal extremity of the lower berth overlapping at least partially with the upper berth, the first transversal extremity being positioned proximate a third vertical element extending vertically,
thereby allowing spaces to be separated within the module.

* * * * *